United States Patent
Kishimoto et al.

(10) Patent No.: US 12,547,930 B2
(45) Date of Patent: Feb. 10, 2026

(54) FEATURE SELECTION AND HYPERPARAMETER OPTIMIZATION USING LDS

(71) Applicant: INTERNATIONAL BUSINESS MACHINES CORPORATION, Armonk, NY (US)

(72) Inventors: Akihiro Kishimoto, Setagaya (JP); Toshiyuki Hama, Setagaya (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1083 days.

(21) Appl. No.: 17/408,650

(22) Filed: Aug. 23, 2021

(65) Prior Publication Data

US 2023/0054582 A1 Feb. 23, 2023

(51) Int. Cl.
*G06N 20/00* (2019.01)
*G06N 7/08* (2006.01)

(52) U.S. Cl.
CPC .............. *G06N 20/00* (2019.01); *G06N 7/08* (2013.01)

(58) Field of Classification Search
CPC ................................. G06N 20/00; G06N 7/08
USPC ........................................................ 706/12
See application file for complete search history.

(56) References Cited

U.S. PATENT DOCUMENTS

| | | | |
|---|---|---|---|
| 6,236,976 B1 | 5/2001 | Ginsberg et al. | |
| 10,600,005 B2 | 3/2020 | Gunes et al. | |
| 11,589,083 B2 * | 2/2023 | Khavronin | H04N 21/231 |
| 2020/0134364 A1 | 4/2020 | Kuruvilla | |

FOREIGN PATENT DOCUMENTS

| | | |
|---|---|---|
| IN | 201941036220 | 3/2021 |
| WO | 2015184729 A1 | 12/2015 |

OTHER PUBLICATIONS

Bousquet, et al., "Critical Hyper-Parameters: No Random, No Cry", arXiv: 1706.03200v1 [cs.LG] Jun. 10, 2017 (Year: 2017).*

(Continued)

*Primary Examiner* — Tsu-Chang Lee
(74) *Attorney, Agent, or Firm* — Tutunjian & Bitetto, P.C.; Robert Richard Aragona

(57) ABSTRACT

A computer-implemented method for simultaneous feature selection and hyperparameter optimization of non-linear models of machine learning is provided including setting a first solution having first hyperparameters and a first set of features of a plurality of features of a training data set, initializing a weight table providing a score for each feature of the first set of features, and initializing a discrepancy. The method further includes performing a limited discrepancy search (LDS), according to an order based on the weight table, to obtain a second solution having second hyperparameters and a second set of features by swapping the first set of features and switching the first hyperparameters from the first solution with the discrepancy, while updating the weight table during LDS, comparing the second solution with the first solution, and obtaining a new solution with improved features and hyperparameters, as an optimized solution.

20 Claims, 10 Drawing Sheets

(56) References Cited

OTHER PUBLICATIONS

Kondo et al., "Optimization of Hyperparameters and Feature Selection for Random Forests and Support Vector Machines by Artificial Bee Colony Algorithm". 人工知能学会論文誌 (Web). 2019;34(2):1-1.

Binder et al., "Multi-Objective Hyperparameter Tuning and Feature Selection using Filter Ensembles", GECCO '20, Jul. 2020, pp. 471-479.

Gupta et al., "Beam Sarch for Feature Selection in Automatic SVM Defect Classification", In Object recognition supported by user interaction for service robots, Jan. 2002, pp. 212-215.

Harvey et al., "Limited discrepancy search", InIJCAI (1) Aug. 1995, pp. 607-615.

CrossValidated, "How should Feature Selection and Hyperparamter optimization be ordered in the machine learning pipeline?", https://stats.stackexchange.com/questions/264533/how-should-feature-selection-and-hyperparameter-optimization-be-ordered-in-the-m, Feb. 2017, pp. 1-4.

Korf RE, "Improved limited discrepancy search", In AAAI/IAAI, vol. 1 Aug. 4, 1996, pp. 286-291.

Thornton et al., "Auto-WEKA: Combined selection and hyperparameter optimization of classification algorithms", In Proceedings of the 19th ACM SIGKDD international conference on Knowledge discovery and data mining, Aug. 11, 2013, pp. 847-855.

Klein et al., "Fast Bayesian Optimization of Machine Learning Hyperparameters on Large Datasets", In Artificial Intelligence and Statistics, Apr. 10, 2017, pp. 528-536.

Ma et al., "Feature Selection with a Local Search Strategy Based on the Forest Optimization Algorithm", Computer Modeling in Engineering & Sciences. Nov. 15, 2019, pp. 569-592.

Yang et al., "Simultaneous Feature Selection and Classification via Semi-Supervised Models", InThird International Conference on Natural Computation (ICNC 2007) Aug. 24, 2007 (vol. 1, pp. 646-650). IEEE.

Boughaci et al., "Three local search-basedmethods for feature selection in credit scoring", Vietnam Journal of Computer Science, May 2018, pp. 107-121.

* cited by examiner

FEATURE SELECTION AND HYPERPARAMETER OPTIMIZATION USING LDS

BACKGROUND

The present invention relates generally to machine learning, and more specifically, to methods and systems for feature selection and hyperparameter optimization using systematic local search based on limited discrepancy search (LDS) and a weight table.

One step in most regression problems is the selection of the variables that explain the response, while removing the others from the model. Usually such procedures are referred to as feature selection techniques and they facilitate learning good and simple regressors with a reduced variable space. Another issue that needs to be addressed when training regressors is the so-called hyperparameter optimization. These hyperparameters are specific to particular types of machine learning (ML) models and can be, depending on the case, the number of neurons, kernel functions and their parameters, regularization constants, etc. Hyperparameters have to be tuned in order to obtain an optimized model given a performance or cost function. Both of these techniques, that is, feature selection and hyperparameter optimization, have a huge impact on model quality, interpretability, training speed, and model evaluation speed where an optimized solution comes as a compromise between these model properties.

SUMMARY

In accordance with an embodiment, a computer-implemented method for simultaneous feature selection and hyperparameter optimization of non-linear models of machine learning is provided. The computer-implemented method includes setting a first solution having first hyperparameters and a first set of features selected from a plurality of features of a training data set, initializing a weight table providing a score for each feature of the first set of features, initializing a discrepancy, performing a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS, comparing the second solution with the first solution, and obtaining a new solution with improved features and improved hyperparameters, as an optimized solution.

In accordance with another embodiment, a computer program product for simultaneous feature selection and hyperparameter optimization of non-linear models of machine learning is provided. The computer program product includes a computer readable storage medium having program instructions embodied therewith, the program instructions executable by a computer to cause the computer to set a first solution having first hyperparameters and a first set of features selected from a plurality of features of a training data set, initialize a weight table providing a score for each feature of the first set of features, initialize a discrepancy, perform a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS, compare the second solution with the first solution, and obtain a new solution with improved features and improved hyperparameters, as an optimized solution.

In accordance with yet another embodiment, a system for simultaneous feature selection and hyperparameter optimization of non-linear models of machine learning is provided. The system includes a memory and one or more processors in communication with the memory configured to set a first solution having first hyperparameters and a first set of features selected from a plurality of features of a training data set, initialize a weight table providing a score for each feature of the first set of features, initialize a discrepancy, perform a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS, compare the second solution with the first solution, and obtain a new solution with improved features and improved hyperparameters, as an optimized solution.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
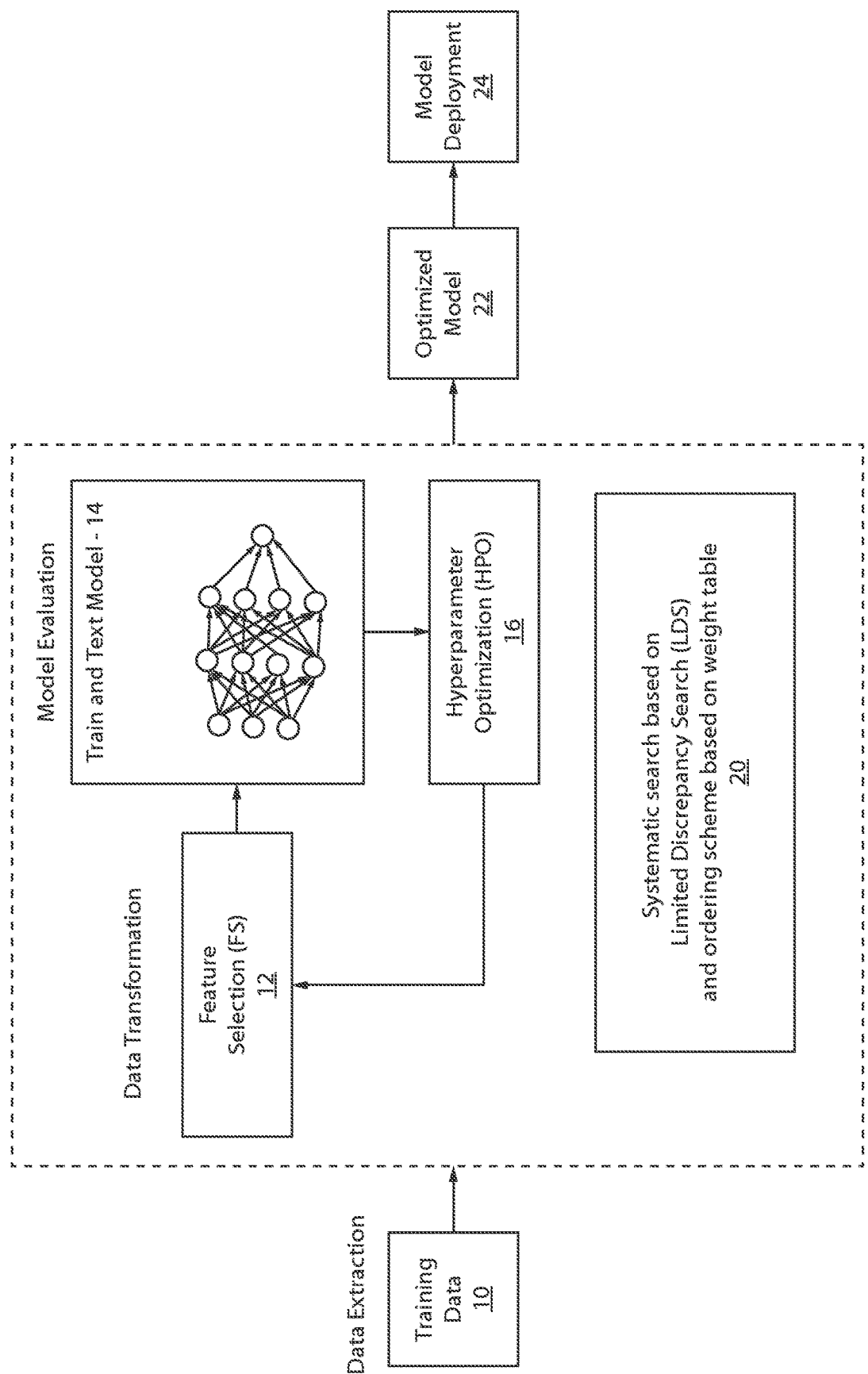
FIG. 1 shows an exemplary machine learning workflow employing Limited Discrepancy Search (LDS) with a weight table, in accordance with an embodiment of the present invention.

Embodiments in accordance with the present invention provide methods and devices for feature selection and hyperparameter optimization by using systematic local search based on limited discrepancy search (LDS) and a weight table. The exemplary embodiments simultaneously or concurrently optimize a feature set and hyperparameters for a given machine learning algorithm. The feature set and hyperparameter configurations are dynamically generated by LDS with an ordering scheme based on the weight table. The exemplary embodiments can be implemented for a prediction domain in material discovery where features are substructures of chemical molecules.

Feature selection methods can be divided into three categories, that is, filter methods, wrapper methods, and embedded methods. Filter methods select the most influential variables for the response according to some ranking measure, where higher rank variables are included in the model. A common approach is to use certain correlative measures between variables and response, starting from simple Pearson correlation towards more elaborate measures that can capture nonlinear relations between them, such as distance correlation, or those based on the Mutual Information measure.

Wrapper methods use the predictor to evaluate variable subsets and they are based on various heuristics and greedy search algorithms. However, for large set of features, the search space is extremely large, thus, they are not used in practice very often. Embedded methods represent a trade-off between the other two, having benefits from both of them. More specifically, embedded methods perform feature selection mechanisms in the process of model construction by employing a filter method. Some learning algorithms do this inherently including regularization in the cost function, one case being Lasso regression.

Machine learning algorithm performances further depend on the choice of their hyperparameters that refer to learning rate, regularization constants, nonlinearity type, etc. Choosing them optimally is a difficult and time-consuming task. The simplest variants of searching the optimized hyperparameters are grid search and random search. However, they require proper coverage of the parameters space, and, thus, many iterations. A more elegant solution is using surrogate optimization algorithms to iteratively map the error dependence on the hyperparameters given the data set. Based on this estimation of the error curve, an acquisition function is used to assess which point in this space is most promising to be evaluated next. Once the new result is obtained, the process of refitting the surrogate function and acquisition is repeated for a fixed number of iterations. One notable case of such optimization procedure is Bayesian Optimization that uses Gaussian Process (GP) for estimating the error dependence on the hyperparameters. The main advantage of this optimization is that it can naturally cope with the stochastic nature of the training/test error of various ML algorithms, as it happens when training neural networks. However, such methods for feature selection and hyperparameter optimization have exhibited limitations.

Finding new materials with good performance is the eternal theme in materials science. Currently, experimental and computational screenings for new materials discovery involve element replacement and structure transformation. However, the compositional search space, structural search space, or both tend to be sharply constrained. Both screening methods may also require massive amounts of computation or experimentation and usually result in effort being directed in incorrect directions in an "exhaustive search," which consumes considerable time and resources. In consideration of this fact and the advantages of machine learning, a method combining machine learning with computational simulation is proposed for the evaluation and screening of new materials to provide suggestions for new and better materials.

The exemplary embodiments of the present invention alleviate such issues in finding new materials by implementing a Limited Discrepancy Search (LDS) with a weighted table. Such configuration can be beneficial in computational material discovery for generating new molecular structures satisfying target property values.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary machine learning workflow employing Limited Discrepancy Search (LDS) with a weight table, in accordance with an embodiment of the present invention.

The training data 10 is supplied for data transformation and model evaluation. Data transformation involves feature selection (FS) 12. Model evaluation involves training and testing the model via train and test component 14. The data transformation and model evaluation are implemented with the systematic search based on LDS with a weighted table 20.

Both feature selection 12 and hyperparameter tuning 16 are key tasks in machine learning. Both hyperparameter tuning 16 and feature selection 12 are often useful to increase model performance. Feature selection 12 is also undertaken to attain sparse models. Sparsity may yield better model interpretability and lower cost of data acquisition, data handling, and model inference. While sparsity may have a beneficial or detrimental effect on predictive performance, a small drop in performance may be acceptable in return for a substantial gain in sparseness. Feature selection 12 can therefore be treated as a multi-objective optimization task. As a result, the exemplary embodiments perform hyperparameter tuning 16 and feature selection 12 simultaneously or concurrently because the choice of features of a model may influence what hyperparameters perform well. After employment of the systematic search based on LDS with a weighted table 20, an optimized model 22 is obtained. The optimized model 22 is then deployed via a model deployment component 24.

Regarding LDS, many problems of practical interest can be solved using tree search methods because carefully tuned successor ordering heuristics guide the search toward regions of the space that are likely to contain solutions. For some problems, the heuristics often lead directly to a solution, but not always. Limited discrepancy search addresses the problem of what to do when the heuristics fail. Our intuition is that a failing heuristic might well have succeeded if it were not for a small number of "wrong turns" along the way. For a binary tree of height d, there are only d ways the heuristic could make a single wrong turn, and only $d(d-i)/2$ ways it could make two. A small number of wrong turns can be overcome by systematically searching all paths that differ from the heuristic path in at most a small number of decision points, or "discrepancies." Thus, limited discrepancy search is a backtracking algorithm that searches the nodes of the tree in increasing order of such discrepancies. Such LDS algorithm is employed with (or in combination with) a weight table, discussed below, for better feature selection and hyperparameter optimization.

Figure 2:
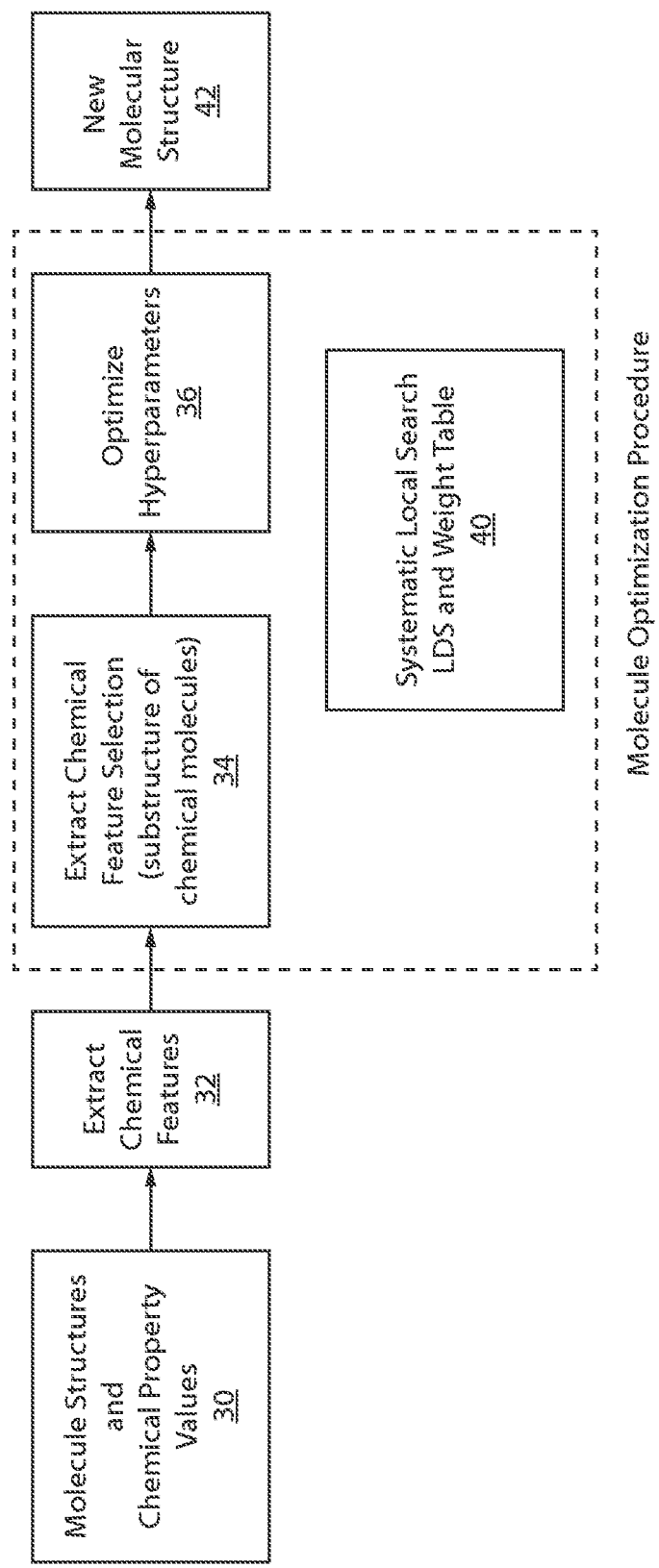
FIG. 2 illustrates a practical application for the machine learning workflow for computational material discovery, in accordance with an embodiment of the present invention.

FIG. 2 illustrates a practical application for the machine learning workflow for computational material discovery, in accordance with an embodiment of the present invention.

Regarding computational material discovery, traditionally, experiments used to play the key role in finding and characterizing new materials. Experimental research must be conducted over a long time period for an extremely limited number of materials, as it imposes high requirements in terms of resources and equipment. Owing to these limitations, important discoveries happened mostly through human intuition. A first computational revolution in materials science was fueled by the advent of computational methods, especially density functional theory (DFT), Monte Carlo simulations, and molecular dynamics, that allowed researchers to explore the phase and composition space far more efficiently. In fact, the combination of both experiments and computer simulations has allowed to cut substantially the time and cost of materials design. The constant increase in computing power and the development of more efficient codes also allowed for computational high-throughput studies of large material groups in order to screen for the ideal experimental candidates. These large-scale simulations and calculations together with experimental high-throughput studies are producing an enormous amount of data making possible the use of machine learning methods to materials science.

The availability of large datasets combined with the improvement in algorithms and the exponential growth in computing power led to an unparalleled surge of interest in the topic of machine learning. As these algorithms start to find their place, they are heralding a second computational revolution. Because the number of possible materials is estimated to be as high as a googol ($10^{100}$), this revolution is doubtlessly required.

Machine learning algorithms aim to optimize the performance of a certain task by using examples and/or past experience. Generally speaking, machine learning can be divided into three main categories, namely, supervised learning, unsupervised learning, and reinforcement learning, as will be discussed further with reference to FIG. 5.

Referring back to FIG. 2, molecule structures and chemical property values 30 are used as a dataset. Chemical features 32 are extracted therefrom. The extracted chemical features are processed by a chemical optimization procedure which includes chemical feature selection (substructure of chemical molecules) 34 and hyperparameter optimization 36, which are enabled by a systematic local search including LDS with a weighted table 40. The molecule optimization procedure results in the generation of new molecular structures 42.

Therefore, machine learning provides a new means of screening novel materials with good performance, developing quantitative structure-activity relationships (QSARs) and other models, predicting the properties of materials, discovering new materials and performing other materials-related studies. One exemplary method of machine learning involves systematic local search with LDS and a weight table, as described herein, for computation material discovery (CMD).

Figure 3:
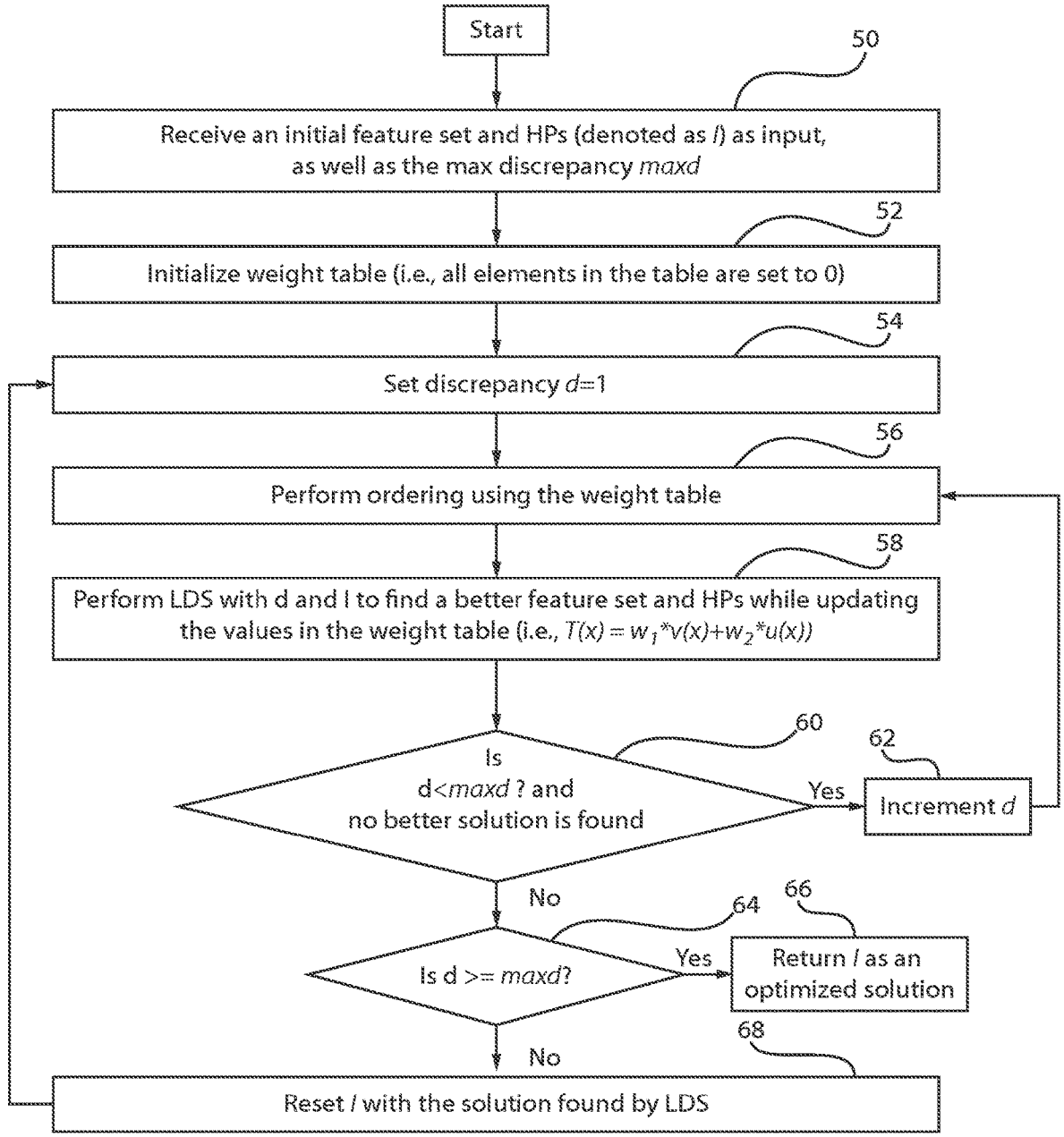
FIG. 3 illustrates a method for implementing the LDS with the weight table, in accordance with an embodiment of the present invention.

FIG. 3 illustrates a method for implementing the LDS with the weight table, in accordance with an embodiment of the present invention.

At block 50, receive an initial feature set and hyperparameters (HPs) (denoted as I) as input, as well as the max discrepancy maxd.

At block 52, initialize the weight table (e.g., all elements in the table are set to 0).

At block 54, set the discrepancy d=1. The discrepancy value is iteratively incremented.

At block 56, perform ordering using the weight table. In one example, features for LDS are ordered in an ascending order (e.g., because features which have not been tried yet are preferred).

At block 58, perform LDS with d and I to find a better or superior feature set and HPs while updating the values in the weight table (e.g., $T(x)=w_1 \cdot v(x)+w_2 \cdot u(x)$). d is a maximum number of features/hyperparameters modified in the initial feature set and hyperparameters. In other words, d is the maximum number of changes to make on the initial path (the initial path being the initial feature set and hyperparameters). Also, x is a variable, $w_1$ and $w_2$ are constants, and $v(x)$ and $u(x)$ are the number of visits of successful improvements. $T(x)$ is a weighted sum of the number of visits to each feature of the plurality of features and the number of successes for improving the objective value.

Moreover, caching previously calculated objective values alleviates the duplicate effort of revisiting the same feature set and HPs during different LDS runs.

At block 60, determine if d<maxd and no better or superior solution is found. If YES, proceed to block 62, where d is incremented. If NO, proceed to block 64.

At block 64, determine if d≥maxd. If YES, proceed to block 66 to return I as an optimized solution. If NO, proceed to block 68.

At block 68, reset I with the solution found by LDS.

Figure 4:
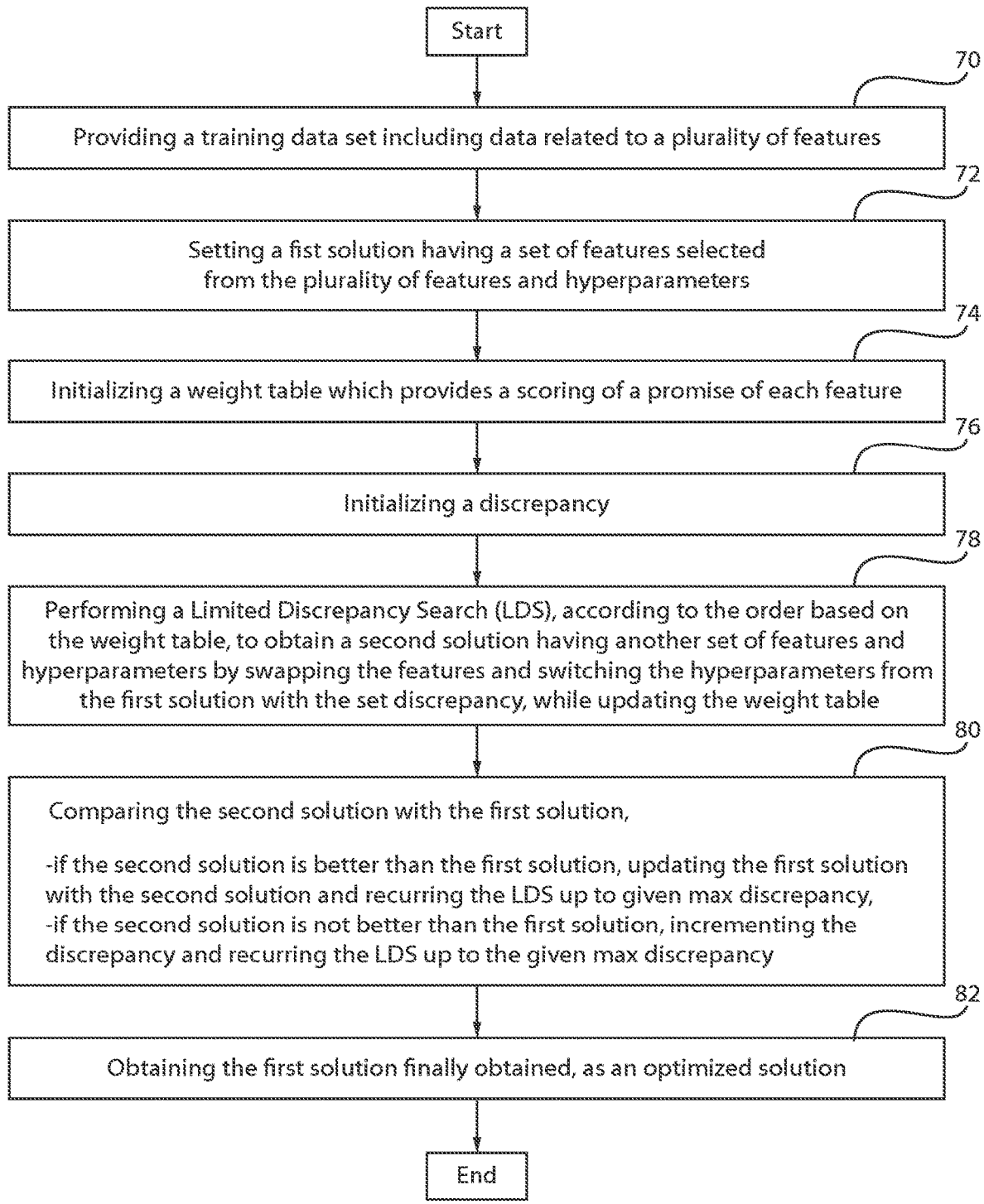
FIG. 4 illustrates a method for simultaneous feature selection (FS) and hyperparameter optimization (HPO) of non-linear models, in accordance with an embodiment of the present invention.

FIG. 4 illustrates a method for simultaneous feature selection (FS) and hyperparameter optimization (HPO) of non-linear models, in accordance with an embodiment of the present invention.

At block 70, provide a training data set including data related to a plurality of features.

At block 72, set a first solution having a set of features selected from the plurality of features and hyperparameters.

At block 74, initialize a weight table which provides a scoring of a promise of each feature.

At block 76, initialize a discrepancy.

At block 78, perform a limited discrepancy search (LDS), according to the order based on the weight table, to obtain a second solution having another set of features and hyperparameters by swapping the features and switching the hyperparameters from the first solution with the set discrepancy, while updating the weight table during LDS.

At block 80, compare the second solution with the first solution. If the second solution is better or superior than the first solution, updating the first solution with the second solution and recurring the LDS up to given max discrepancy. If the second solution is not better or superior than the first solution, incrementing the discrepancy and recurring the LDS up to the given max discrepancy.

At block 82, obtain the first solution finally obtained, as an optimized solution.

Figure 5:
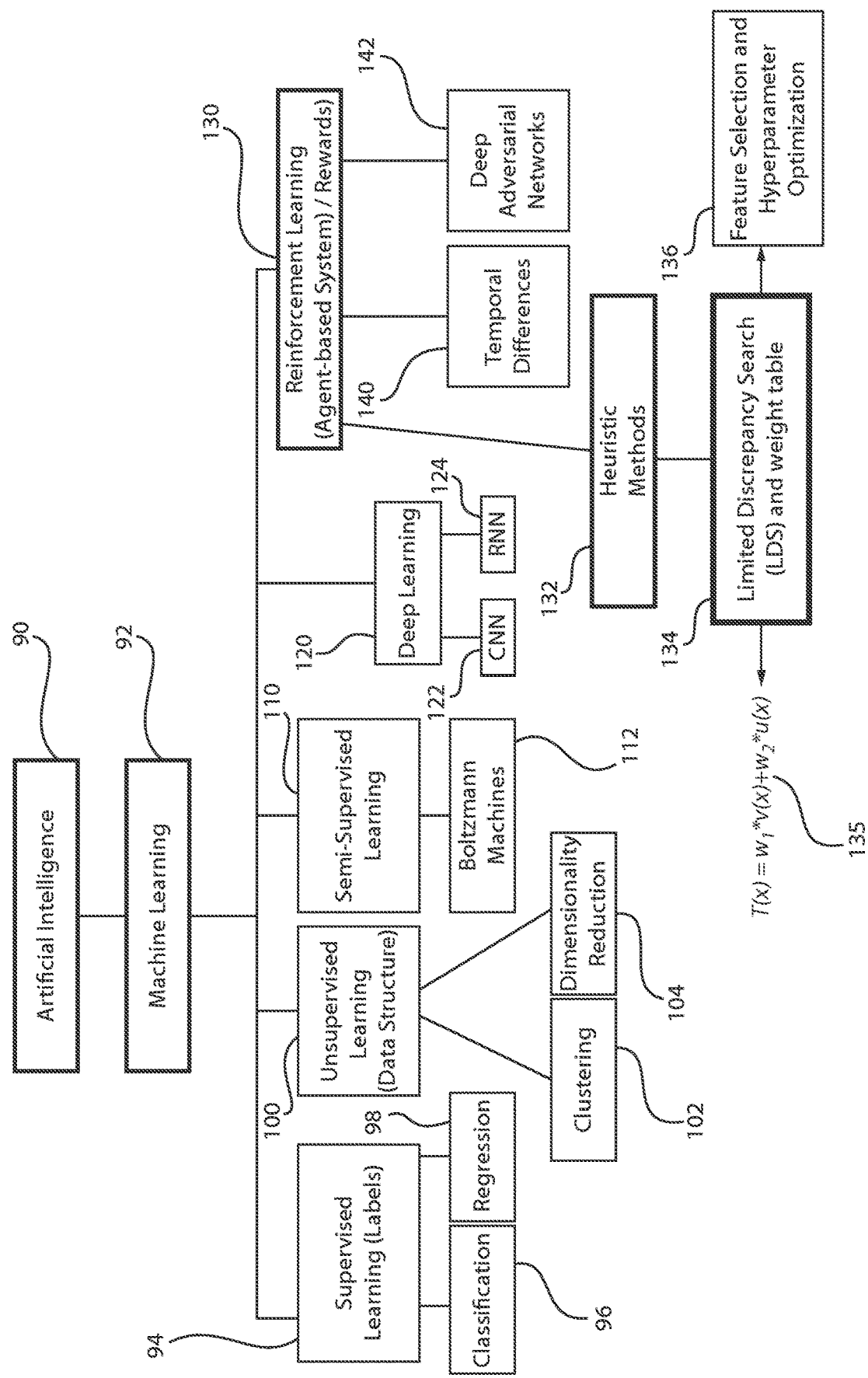
FIG. 5 is a block/flow diagram of an exemplary breakdown of machine learning in artificial intelligence (AI) and where LDS fits in, in accordance with an embodiment of the present invention.

FIG. 5 is a block/flow diagram of an exemplary breakdown of machine learning in artificial intelligence (AI) and where LDS fits in, in accordance with an embodiment of the present invention.

Artificial intelligence 90 includes machine learning 92. Machine learning 92 can be divided into supervised learning 94, unsupervised learning 100, semi-supervised learning 110, deep learning 120, and reinforcement learning 130.

Supervised learning 94 can include, e.g., classification 96 and regression 98.

Unsupervised learning 100 can include, e.g., clustering 102 and dimensionality reduction 104.

Semi-supervised learning 110 can include, e.g., application of Boltzmann machines 112.

Deep learning 120 can include, e.g., convolutional neural networks (CNN) 122 and recurrent neural networks (RNN) 124.

Reinforcement learning 130 can include temporal differences 140 and deep adversarial networks 142. Reinforcement learning 130 can further include heuristic methods 132, which include the limited discrepancy search (LDS) with weighted table 134 of the exemplary embodiments of the present invention. The LDS with weighted table 134 is employed for feature selection and hyperparameter optimization 136. The LDS with weighted table 134 can implement $T(x)=w_1 \cdot v(x)+w_2 \cdot u(x)$, designated as equation 135, where x is a variable, $w_1$ and $w_2$ are constants, and $v(x)$ and $u(x)$ are the number of visits of successful improvements. $T(x)$ is a weighted sum of the number of visits to each feature of the plurality of features and the number of successes for improving the objective value. In one embodiments, the features are ordered in an ascending order.

Figure 6:
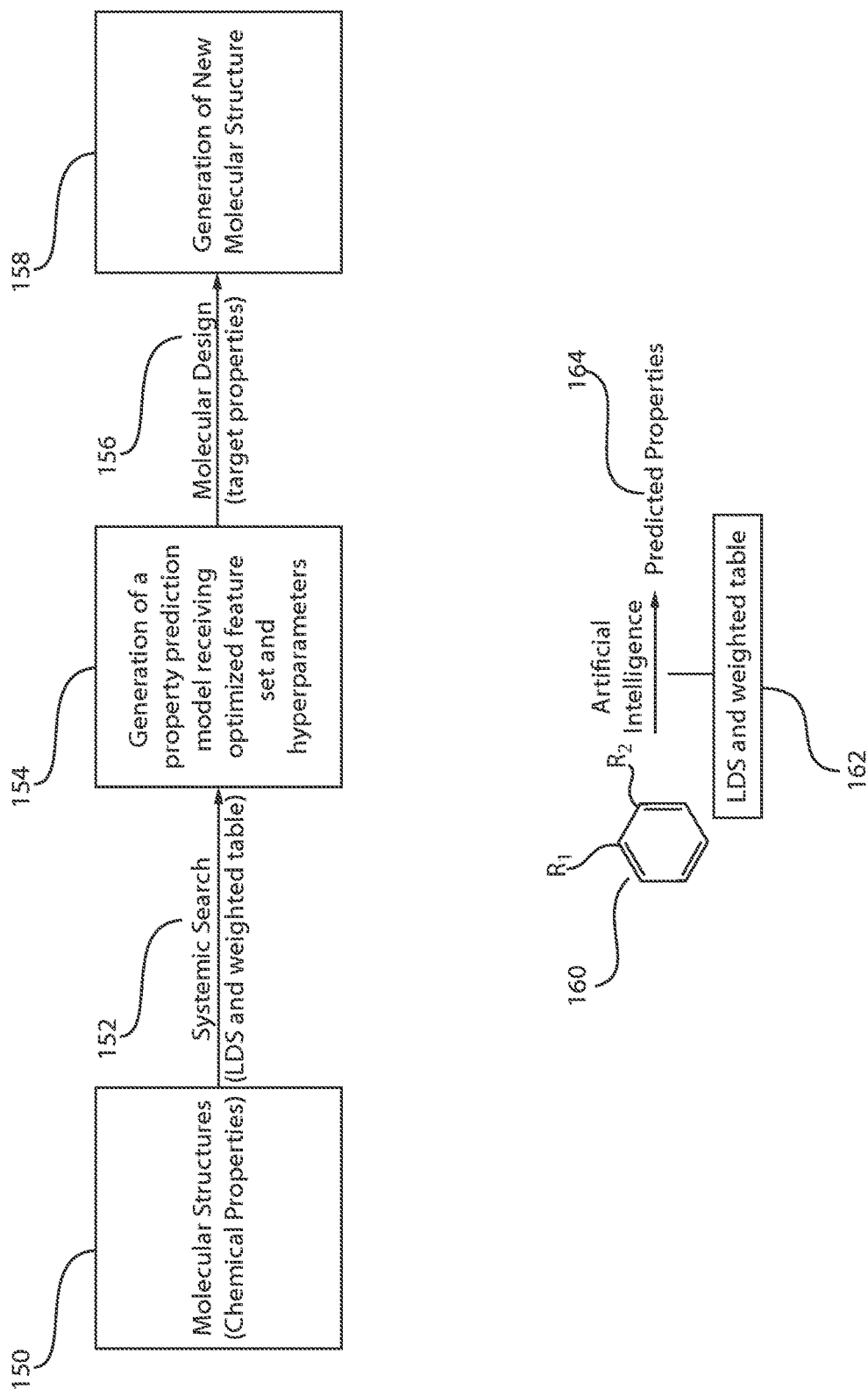
FIG. 6 is a block/flow diagram of an exemplary practical application for chemical discovery on how chemical properties are predicted or how new molecules are generated, in accordance with an embodiment of the present invention.

FIG. 6 is a block/flow diagram of an exemplary practical application for chemical discovery on how chemical properties are predicted or how new molecules are generated, in accordance with an embodiment of the present invention.

In one practical application, related to material discovery, molecular structures 150 having chemical properties can be used as a dataset to generate a property prediction model 154 for receiving optimized features and hyperparameters. This can be accomplished by employing the systematic search 152 having the LDS with weighted table. Molecular designs 156 with target properties can enable the generation of new molecular structures 158.

One example is shown, where artificial intelligence is applied to a molecular structure 160 to generate predicted properties 164. The artificial intelligence applied can be the exemplary LDS with weighted table 162.

To summarize, the properties of materials, such as hardness, melting point, ionic conductivity, glass transition temperature, molecular atomization energy, and lattice constant, can be described at either the macroscopic or microscopic level. There are two common methods of studying materials properties, that is, computational simulation and experimental measurement. These two methods involve complicated operations and experimental setup. Therefore, it is quite difficult to build computational simulations that fully capture the complicated logical relationships between the properties of a material and their related factors, and some of these relationships may even be unknown. Moreover, the experiments that are performed to measure the properties of compounds generally occur in the later stages of materials selection.

Consequently, if the results are not satisfactory, the enormous amounts of time and experimental resources invested up to that point prove to have been wasted. In addition, in many cases, it is difficult or nearly impossible to study the properties of materials even through massive computational or experimental efforts. Therefore, there is an urgent need to develop intelligent and high-performance prediction models that can correctly predict the properties of materials at a low temporal and computational cost. Machine learning concerns the construction and study of algorithms that can learn patterns from data. The basic idea of using machine learning methods for material property prediction is to analyze and map the relationships (nonlinear in most cases) between the properties of a material and their related factors by extracting knowledge from existing empirical data. FIGS. 1-6 show the fundamental framework for the application of machine learning in material property prediction by employing an LDS with a weighted table.

In conclusion, machine learning models often need to satisfy multiple objectives simultaneously to accommodate the nature of a practical setting. Usually the main goal is predictive performance. On large and complex datasets this necessitates highly nonlinear algorithms, which have hyperparameters that need to be chosen carefully. Hyperparameter optimization poses a substantial challenge in machine learning. Besides few model-specific methods, there are no general analytic representations of model performance with respect to hyperparameter settings. Performance therefore needs to be estimated using test-set evaluation or cross-validation. Hyperparameter optimization is therefore an expensive black-box optimization problem. Besides predictive performance, model sparsity is frequently another desirable objective. Sparser models help with interpretability, e.g., a better understanding of the underlying process that generated the data. In addition to that, predictions can be made faster and more cost-effectively. Sparser models may even have better predictive performance, since they regularize against overfitting.

The process of feature selection aims to select a small subset of relevant features while still constructing models with sufficient or even optimal predictive performance. Because every feature subset evaluation requires either one or multiple model fits, an exhaustive search is usually not feasible, and a black-box discrete optimization search strategy is necessary. Commonly used are simple greedy methods like forward or backward search. More advanced methods like evolutionary algorithms can improve upon this. Feature selection is often considered as a single-objective task. Sometimes the feature selection step is only used to optimize performance. However, in many applications it is desirable to forego a small drop in performance for a substantial gain in sparseness. This leads to a natural treatment of the feature selection problem as a multi-objective optimization problem, that is, maximize predictive performance while minimizing the number of features selected. Feature selection methods may aggregate model performance and the number of features into a single objective function through a penalization term. However, this implies a trade-off between performance and sparsity.

Multi-objective optimization methods try to find a set of solutions that represent different trade-offs between the goals, enabling the user to consider the possible alternatives and to choose a fitting solution a-posteriori. This is beneficial for feature selection. However, hyperparameter optimization and feature selection are often performed in separate steps. The exemplary embodiments jointly optimize the combined spaces of hyperparameters and feature subsets by employing the LDS with weighted table.

In alternative embodiments, LDS can additionally incorporate a scheme for heuristically evaluating features and HPs, based on the score calculated by a smaller number of repeated k-fold cross validations than the intended one. In one example, 3 repeats can be performed for approximation and the model can be re-evaluated with 10 repeats for the original repeated k-fold if the 3-repeat approximation returns a good score. It is also possible to introduce a hierarchical evaluation such as 3 repeats for initial approximation, 5 repeats if promising in the initial approximation, and 10 repeats for the original repeated k-fold if the 5-repeat approximation is promising.

In alternative embodiments, features in the computational material discovery (CMD) initiatives are substructures of chemical molecules. Another possible enhancement is to prepare heuristic weights $w_1(x)$ and $w_2(x)$ for variable x (e.g., chemical substructure) and modify the formula for the weight table as follows: $T(x)=w_1(x)\cdot v(x)+w_2(x)\cdot u(x)$.

In alternative embodiments, another possible enhancement is to calculate a heuristic value $d(x)$ (value of 1 in the original LDS) to subtract from the discrepancy value when a variable x is chosen. As mentioned above for the weight table, one embodiment is to use the information on chemical substructures.

The advantages of the exemplary embodiments include at least that LDS can receive any feature set and HPs calculated by any other approach (e.g., greedy algorithm) as an initial solution and tune them further. If no solution is found with LDS with discrepancy value d, LDS with d+1 covers larger local search spaces not previously examined. In contrast, greedy backward feature elimination/forward feature addition suffers from the local minimum despite its low computational complexity which is $O(N^2)$. Thus, local minimum can be systematically avoided within the maximum discrepancy values. In practice, a small value for maxd is set where maxd is the maximum discrepancy, since it is sufficient to avoid many of the local minimum. For small maxd, the exemplary embodiments approximately require only $O(L\times (N+M)^{maxd})$ time for a binary-tree search space in the worst case scenario where L is the number of LDS searches. Thus, computational complexity can be significantly reduced compared to the examination of the whole search spaces.

Figure 7:
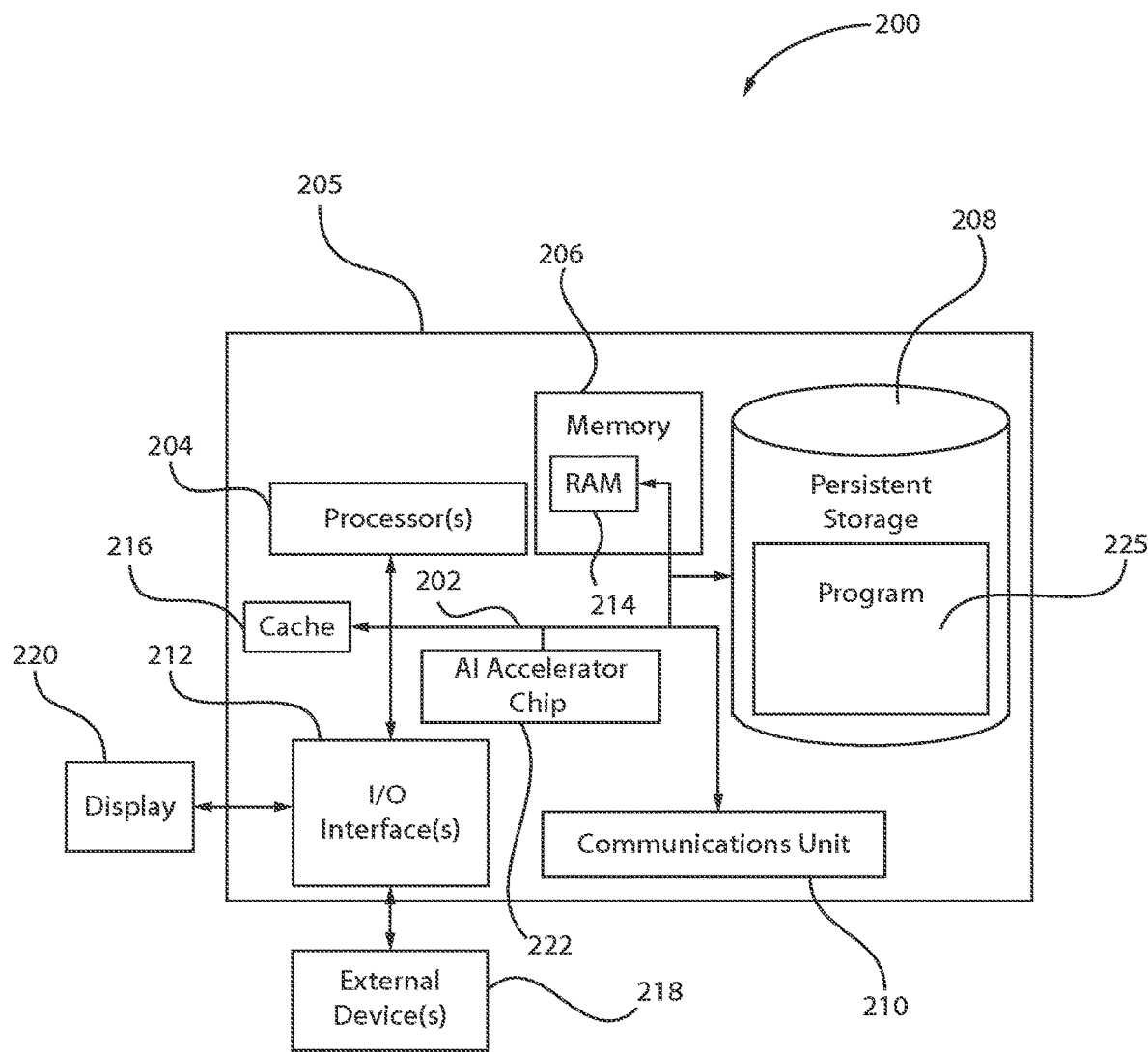
FIG. 7 is a block/flow diagram of an exemplary processing system for employing the LDS with the weight table, in accordance with an embodiment of the present invention.

FIG. 7 is a block/flow diagram of an exemplary processing system for employing the LDS with the weight table, in accordance with an embodiment of the present invention.

FIG. 7 depicts a block diagram of components of system 200, which includes computing device 205. It should be appreciated that FIG. 7 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement simultaneous feature selection and hyperparameter optimization) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 8:
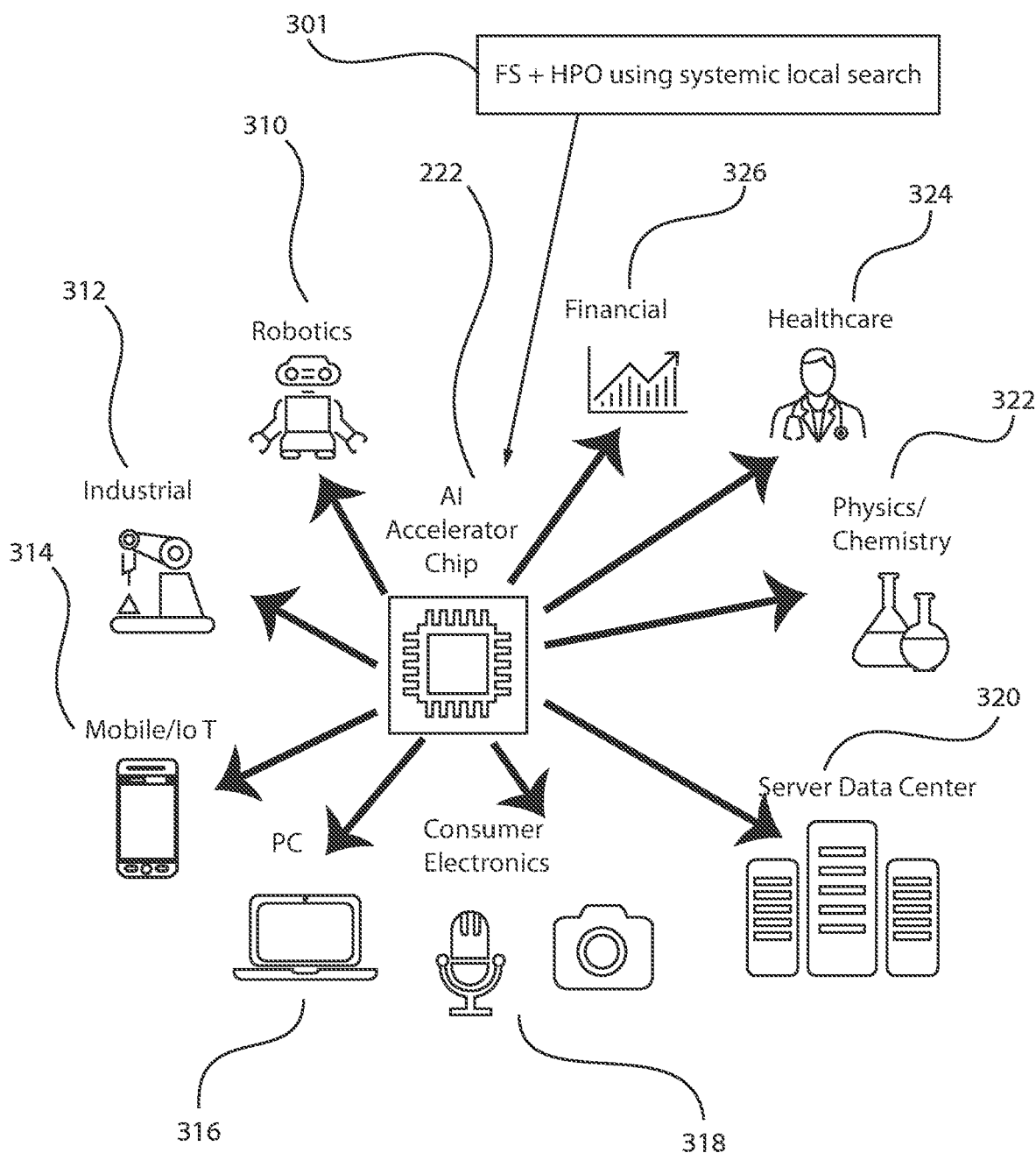
FIG. 8 illustrates practical applications for employing the LDS with the weight table via an artificial intelligence (AI) accelerator chip, in accordance with an embodiment of the present invention.

FIG. 8 illustrates practical applications for employing the LDS with the weight table via an artificial intelligence (AI) accelerator chip, in accordance with an embodiment of the present invention.

The artificial intelligence (AI) accelerator chip 222 can implement the FS and HPO using systematic local search 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

Figure 9:
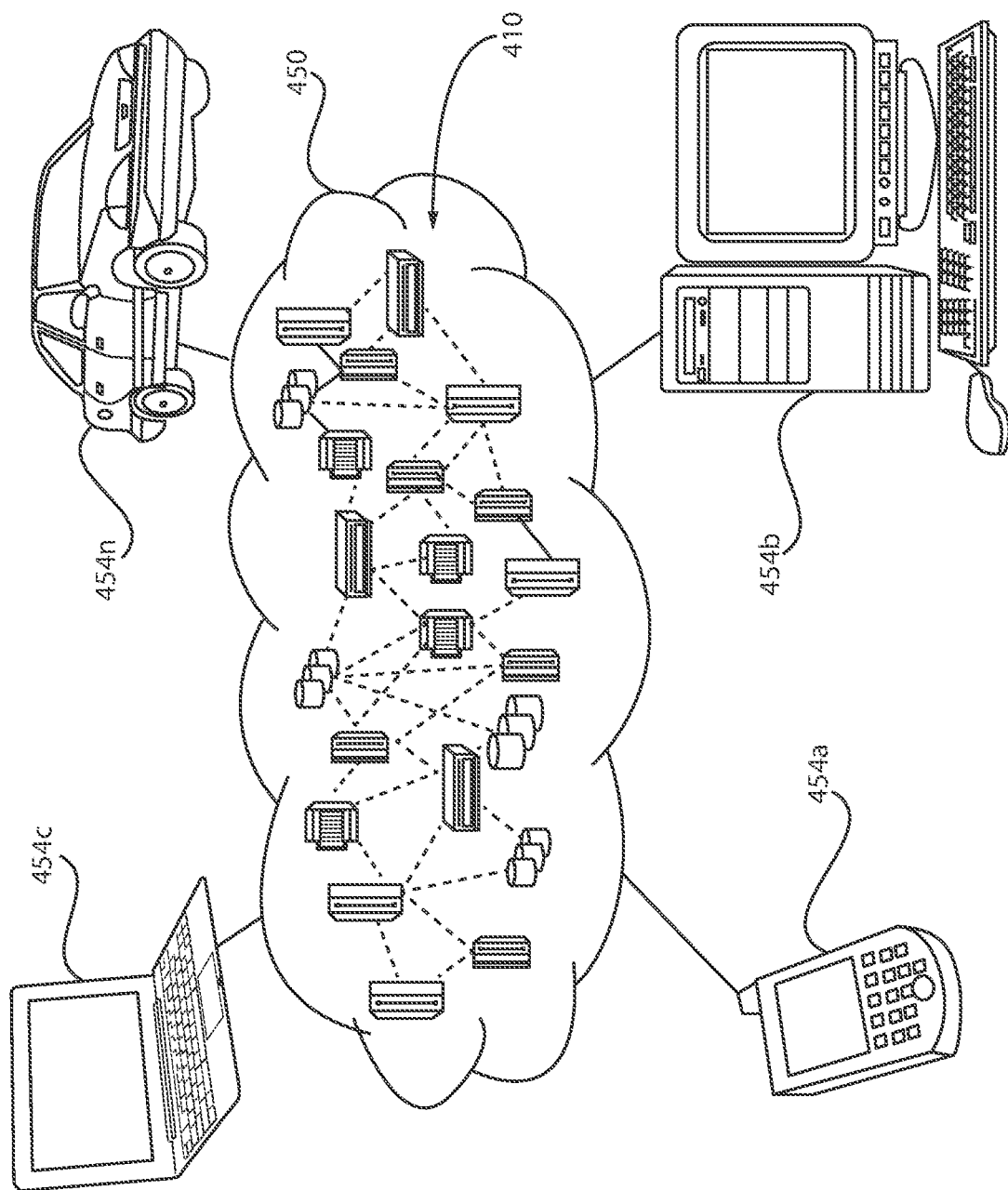
FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 9 are intended to be illustrative only and that computing nodes 410 and cloud computing environment 450 can communicate with any type of computerized device over any type of network and/or network addressable connection (e.g., using a web browser).

Figure 10:
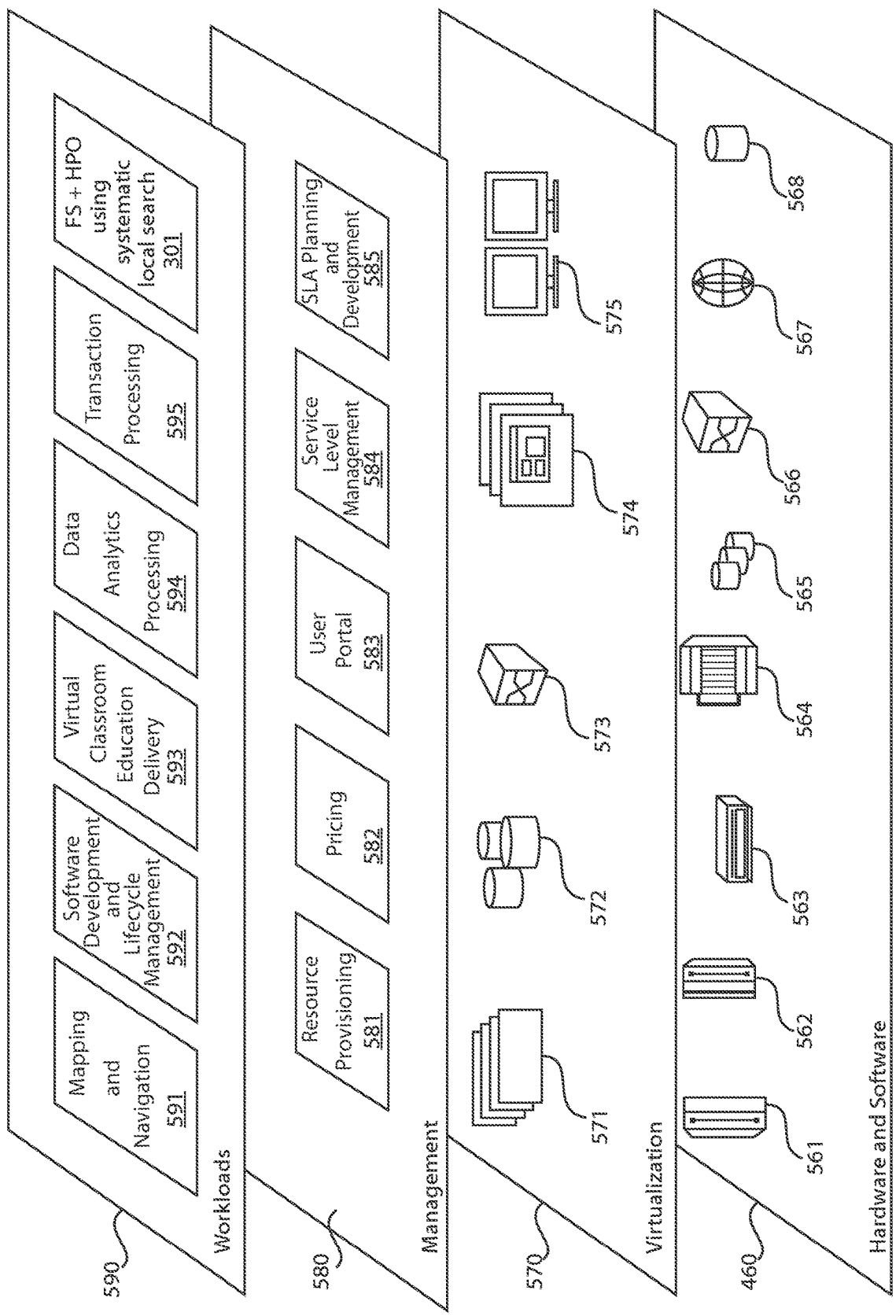
FIG. 10 is a schematic diagram of exemplary abstraction model layers, in accordance with an embodiment of the present invention.

FIG. 10 is a schematic diagram of exemplary abstraction model layers, in accordance with an embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and FS and HPO using systematic local search 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for feature selection and hyperparameter optimization using systematic local search based on limited discrepancy search (LDS) and a weight table (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for simultaneous feature selection and hyperparameter optimization of non-linear models of machine learning, the method comprising:
   setting a first solution having first hyperparameters and a first set of features selected from a plurality of features of a training data set;
   initializing a weight table providing a score for each feature of the first set of features;
   initializing a discrepancy;
   evaluating and screening chemical structures according to the first hyperparameters and the first set of features to identify the chemical structure that satisfies a set of target properties;
   performing a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS;
   comparing the second solution with the first solution;
   obtaining a new solution with improved features and improved hyperparameters, as an optimized solution; and
   selecting an optimized chemical structure with predicted properties that satisfy the target properties.

2. The computer-implemented method of claim 1, wherein, if the second solution is better than the first solution, updating the first solution with the second solution and recurring the LDS up to given maximum discrepancy.

3. The computer-implemented method of claim 1, wherein, if the second solution is not better than the first solution, incrementing the discrepancy and recurring the LDS up to the given maximum discrepancy.

4. The computer-implemented method of claim 1, wherein the discrepancy is a maximum number of modified features and hyperparameters.

5. The computer-implemented method of claim 1, wherein the updating of the weight table during LDS is enabled by a weighted sum of a number of visits to each feature of the plurality of features and a number of successes for improving an objective value.

6. The computer-implemented method of claim 5, wherein the weighted sum is given by:

$$T(x)=w_1 \cdot v(x)+w_2 \cdot u(x),$$

where x is a variable, $w_1$ and $w_2$ are constants, and $v(x)$ and $u(x)$ are the number of visits of successful improvements.

7. The computer-implemented method of claim 1, wherein the features of the plurality of features are ordered in an ascending order.

8. A computer program product for simultaneous feature selection and hyperparameter optimization of non-linear models of machine learning, the computer program product comprising a computer readable storage medium having program instructions embodied therewith, the program instructions executable by a computer to cause the computer to:
   setting a first solution having first hyperparameters and a first set of features selected from a plurality of features of a training data set, to identify a chemical structure satisfying target properties;

initialize a weight table providing a score for each feature of the first set of features;

initialize a discrepancy;

evaluate and screen chemical structures according to the first hyperparameters and the first set of features to identify the chemical structure that satisfies a set of target properties;

perform a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS;

compare the second solution with the first solution;

obtaining a new solution with improved features and improved hyperparameters, as an optimized solution; and selecting an optimized chemical structure with predicted properties that satisfy the target properties.

9. The computer program product of claim 8, wherein, if the second solution is better than the first solution, updating the first solution with the second solution and recurring the LDS up to given maximum discrepancy.

10. The computer program product of claim 8, wherein, if the second solution is not better than the first solution, incrementing the discrepancy and recurring the LDS up to the given maximum discrepancy.

11. The computer program product of claim 8, wherein the discrepancy is a maximum number of modified features and hyperparameters.

12. The computer program product of claim 8, wherein the updating of the weight table during LDS is enabled by a weighted sum of a number of visits to each feature of the plurality of features and a number of successes for improving an objective value.

13. The computer program product of claim 12, wherein the weighted sum is given by:

$$T(x)=w_1 \cdot v(x)+w_2 \cdot u(x),$$

where x is a variable, $w_1$ and $w_2$ are constants, and $v(x)$ and $u(x)$ are the number of visits of successful improvements.

14. The computer program product of claim 8, wherein the features of the plurality of features are ordered in an ascending order.

15. A system for simultaneous feature selection and hyperparameter optimization of non-linear models of machine learning, the system comprising:

a memory; and one or more processors in communication with the memory configured to:

set a first solution having first hyperparameters and a first set of features selected from a plurality of features of a training data set, to identify a chemical structure satisfying target properties;

initialize a weight table providing a score for each feature of the first set of features;

initialize a discrepancy;

evaluate and screen chemical structures according to the first hyperparameters and the first set of features to identify the chemical structure that satisfies a set of target properties;

perform a limited discrepancy search (LDS), according to an order based on the weight table, to obtain a second solution having second hyperparameters and a second set of features from the plurality of features by swapping the first set of features and switching the first hyperparameters from the first solution with the discrepancy, while updating the weight table during LDS;

compare the second solution with the first solution;

obtaining a new solution with improved features and improved hyperparameters, as an optimized solution; and select an optimized chemical structure with predicted properties that satisfy the target properties.

16. The system of claim 15, wherein, if the second solution is better than the first solution, updating the first solution with the second solution and recurring the LDS up to given maximum discrepancy.

17. The system of claim 15, wherein, if the second solution is not better than the first solution, incrementing the discrepancy and recurring the LDS up to the given maximum discrepancy.

18. The system of claim 15, wherein the discrepancy is a maximum number of modified features and hyperparameters.

19. The system of claim 15, wherein the updating of the weight table during LDS is enabled by a weighted sum of a number of visits to each feature of the plurality of features and a number of successes for improving an objective value.

20. The system of claim 19, wherein the weighted sum is given by:

$$T(x)=w_1 \cdot v(x)+w_2 \cdot u(x),$$

where x is a variable, $w_1$ and $w_2$ are constants, and $v(x)$ and $u(x)$ are the number of visits of successful improvements.

* * * * *